(No Model.) 2 Sheets—Sheet 1.
J. DAGES.
HORSE POWER.
No. 491,267. Patented Feb. 7, 1893.
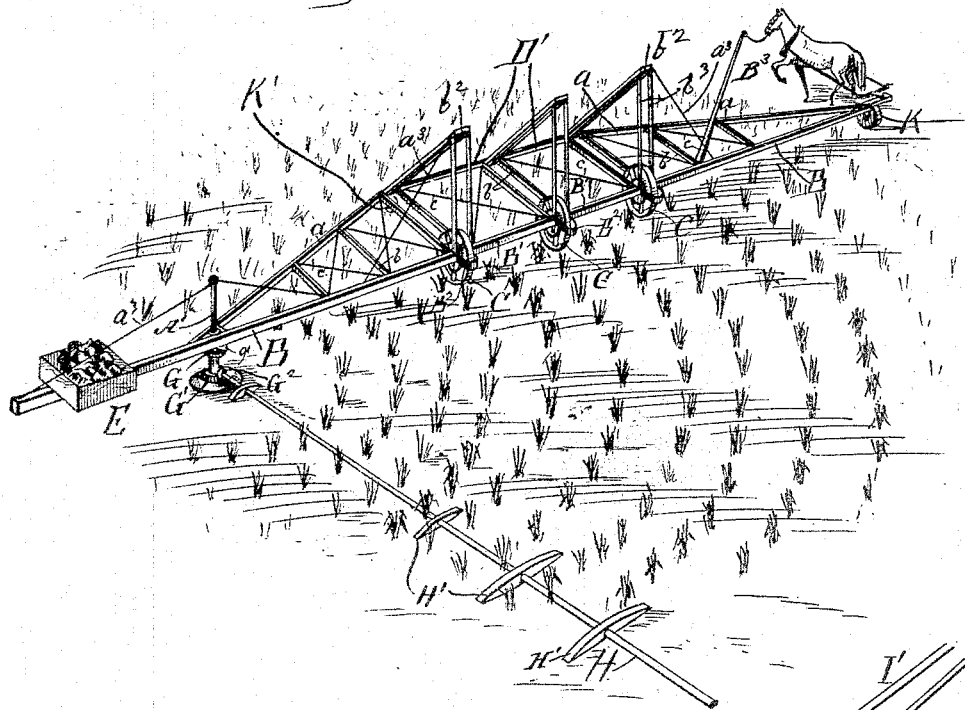
Witnesses,
James Sterling
Laura Shaffer
Inventor,
John Dages
By Fred W. Bond
His Attorney

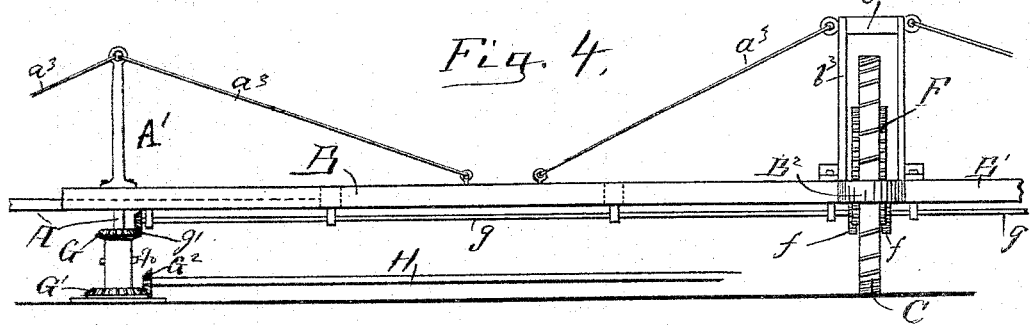
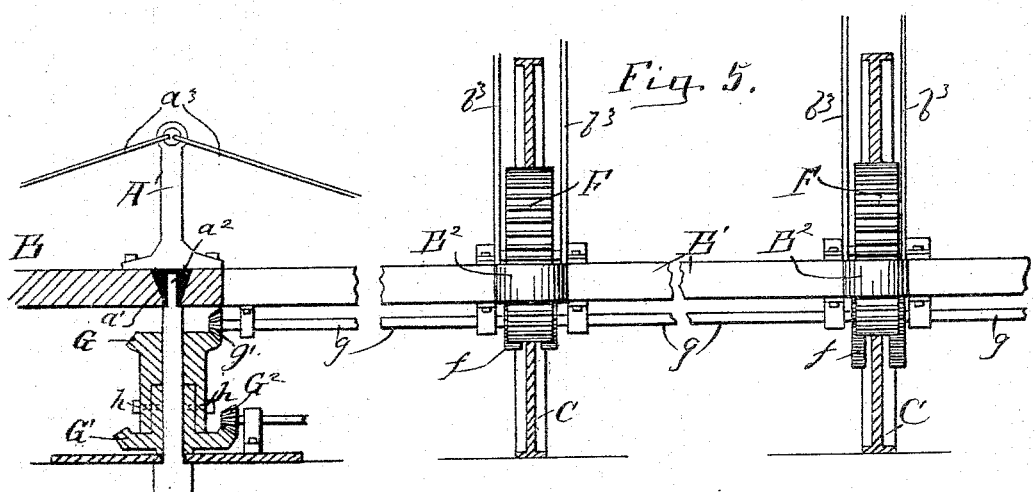
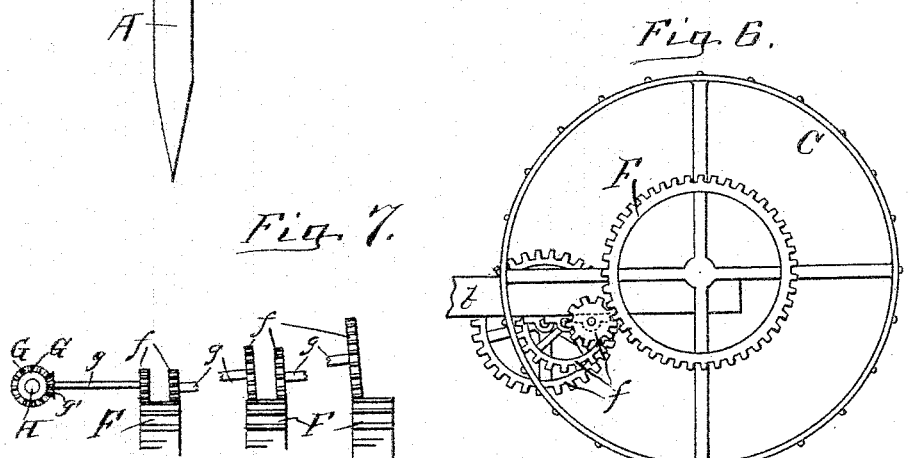
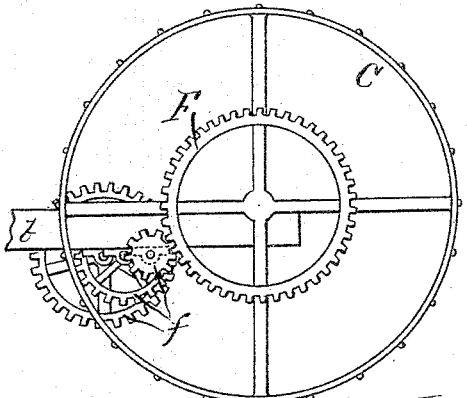

UNITED STATES PATENT OFFICE.

JOHN DAGES, OF NAVARRE, OHIO.

HORSE-POWER.

SPECIFICATION forming part of Letters Patent No. 491,267, dated February 7, 1893.

Application filed September 12, 1892. Serial No. 445,645. (No model.)

*To all whom it may concern:*

Be it known that I, JOHN DAGES, a citizen of the United States, residing at Navarre, in the county of Stark and State of Ohio, have invented certain new and useful Improvements in Horse-Powers; and I do hereby declare that the following is a full, clear, and exact description of the same, reference being had to the annexed drawings, making a part of this specification, and to the letters of reference marked thereon, in which—

Figure 1, is a perspective view, showing the application of my invention. Fig. 2, is a top view showing the different parts properly located. Fig. 3, is a transverse section of one of the implement attaching-bars. Fig. 4, is a rear view showing one of the traveling wheels properly located. Fig. 5, is a sectional view showing the location and arrangement of the different gearing. Fig. 6, is a side view showing one set of intermediate gearing and illustrating one of the traveling wheels. Fig. 7, is a view showing the arrangement of the gearing, designed for the propelling shaft.

The present invention has relation to horse powers, and it consists in the novel arrangement and construction of the different parts hereinafter described and particularly pointed out in the claims.

Similar letters of reference indicate corresponding parts in all the figures of the drawings.

In the accompanying drawings, A represents the main or center-post, which is securely held in an upright position by means of suitable frame work, or by firmly seating the post in the ground. On the top or upper end of the main center post, is loosely pivoted the bar B, which bar may be of any desired length, and as shown in Fig. 1, it extends past and beyond the main center post A. To one end of the main bar B, is attached another main bar B B', by means of the connecting bar or link $B^2$, or its equivalent. Between the main bars B, is journaled a traveling wheel such as C, which may be located substantially as illustrated in Figs. 1 and 2.

For the purpose of strengthening the main bars B, the braces $a$, are provided, which braces are located and arranged substantially as illustrated in Figs. 1 and 2, and are for the purpose of strengthening the braces $a$, the cross bars $b$ are provided, which cross bars are attached in any convenient manner, to the brace $a$, and the main bar B and B'. If desired the axle of the traveling wheel C, may be properly journaled to the end bars $b$, substantially as illustrated in Figs. 1 and 2.

For the purpose of holding the main bars B in proper alignment, when power is applied as hereinafter described, the braces $a$, are securely united together by means of the connecting links or bars D, which connecting bars or links are located substantially as illustrated in Fig. 2. In the event a number of sections are to be attached together additional traveling wheels such as C, are provided, and are located between each of the sections, substantially as illustrated in Fig. 1. The number of traveling wheels corresponding with the number of sections designed to be attached together.

For the purpose of providing what might be termed a truss the rods $c$, are provided and are attached and located as illustrated in Figs. 1 and 2, and as shown, one end of each of the bars $c$, is attached to one of the main bars by means of the eyes $d$, or their equivalents, and the opposite end of each of said rods $c$, is attached to one of the braces $a$, by means of the eyes $d'$, or their equivalent. The front or forward portions of the interposed sections B' are each provided with the bars D', to which bars suitable truss-rods are attached; said truss rods being substantially the same and arranged in substantially the same manner as the rods $c$, located in and attached to the end-sections. It will be understood that in attaching the different sections together, additional connecting bars, such as $B^2$, and D, should be employed.

For the purpose of clearing the traveling wheel C, the connecting bars or links $B^2$, should be bent or curved substantially as illustrated in Figs. 1 and 2 and for the purpose of easily detaching the sections, the connecting bars or links $B^2$, and D, should be attached at their respective places by means of clamping bolts, thereby providing an easy means of adjusting the length of the sweep by increasing or decreasing the number of sections composing the sweep proper. It will be understood that the length of the sweep proper is to correspond with the size of the field or bed designed to be tilled.

For the purpose of assisting in holding the sweep or sections, the counter-balance E, is provided, which in this instance is a box, having placed therein weights; but it will be understood that any other kind or style of counter-balance may be used without departing from the nature of my invention; as the only object to be accomplished by the counter-balance is to compensate for the weight of the sweep proper. It will be understood that the counter-balance E, is to be somewhat lighter than the sweep proper, as it is only designed to assist in supporting the sweep in proper horizontal position, and relieve a portion of the weight of said sweep from the traveling wheels.

For the purpose of allowing a limited vertical or rocking motion of the sweep, the aperture $a'$, formed in the main bar B, is formed tapering as illustrated in Fig. 5, thereby allowing the main bar B to rock or oscillate upon the pin or stud $a^2$.

For the purpose of causing the post A', to oscillate in unison with the sections composing the sweep proper, said post is securely attached to the top or upper side of the main bar B. By this arrangement the strain of the guy-rods or braces, connected to the top or upper end of the post A', will have the same strain at all times irrespective of the oscillating movements of the sweep proper. It will be understood that the post A' may be attached by means of suitable clamping bolts or their equivalents and is so attached that it will rotate with the sweep proper. It will be understood that any number of guy-rods may be attached to the top or upper end of the post A'. In the drawings, but two guy rods are illustrated, but it will be understood that the number may be increased without departing from the nature of my invention. Each of the traveling wheels C, is provided with the cog-wheels F, which are preferably formed of the same diameter, and are provided with the same number of cogs. The cog-wheels F, are formed of sufficient width to allow pinions to be located upon each side of the center spokes of the traveling-wheels C; this construction and arrangement are best illustrated in Fig. 5. It will be understood that the greater the distance the traveling wheels C, are from the main post A, the greater number of revolutions the traveling wheels C, will make to one revolution of the sweep proper. And in order to compensate for the increased revolutions of the traveling-wheels C, the pinions $f$, increase in diameter in proportion to the increased distance between the center post A, and the cog-wheel F. By this peculiar arrangement, the power of each of the traveling-wheels can be communicated to the shafts $g$, which shafts are journaled to the sweep proper. One end of the inner section of the shaft $g$, is provided with the pinion $g'$, which pinion meshes with the beveled cog-wheel G. To the beveled cog-wheel G, is securely attached the beveled cog-wheel G', by means of the connecting pins $h$. It will be understood that the cog-wheels G and G', may be formed integral; but I prefer to form said wheels separate, and attach them together substantially as illustrated in Fig. 5. The power-shaft H, is located substantially as shown in the drawings, and should be placed close to the ground, so as not to interfere with the annular movements of the traveling wheels C, together with the sweep and its different attachments. In the event the shaft H, is located above or on top of the ground, bridges such as H', may be provided to carry the traveling wheels over and past the power-shaft H. But it will be understood that in the event the power shaft is located below the surface of the ground, the bridges H' may be dispensed with.

When it is desired to use my device for cultivating or like purposes, the sweep is placed in the position illustrated in Fig. 1, the length of the sweep corresponding to the size of the field or bed designed to be worked; and in the event it is desired to mark or furrow the ground, suitable markers are attached to the sweep proper, and when a revolution of the sweep is made, it marks the rows upon the field or bed; it being understood that the rows are circles as indicated in Fig. 1. It will be understood that different implements such as markers, harrows, cultivators, rakes, shovels, and plows can be attached to the sweep proper, reference being had to the kind of work desired to be done.

When it is desired to use my device as a horse power only, the interposed sections of the sweep may be removed, and the end sections united together as illustrated in Fig. 2, thereby forming a sweep for a horse-power. As the sweep proper, is rotated around the main center post, A, rotary motion will be communicated to the shaft $g$, which shaft communicates rotary motion to the power shaft H, by means of the wheels G, and G', and the pinion G². The outer end of the power-shaft H, may be provided with a pulley such as I, which pulley is for the purpose of conveying power by means of a suitable belt such as I'.

In the event it is desired to use my device for cultivating only, the shafts $g$, may be removed.

In the event it is desired to cultivate the field by steam-power, a belt such as I', may lead from the drive-pulley of a steam engine to the pulley I, and rotary motion of the sweep around the center post, be communicated by means of the power shaft H, and the interposed gearing. By this arrangement the power is reversed.

For the purpose of holding the outer end of the sweep proper, a small wheel such as K, should be located substantially as illustrated in Fig. 1.

For the purpose of preventing the sections composing the sweep, from tilting, the small traveling-wheels K' are properly journaled to the front or forward edge of the sweep.

For the purpose of providing a means for attaching different implements to the sweep proper, the T-shaped bar L, is attached to the rear side or edge of the sweep by means of suitable bolts such as $k$, or their equivalents which T-shaped bar L, may extend the entire length of each section. The number of T-shaped bars L, correspond with the number of the sections. The said T-shaped bars may be of any desired length.

For the purpose of providing a means for attaching different implements to the T-shaped bar L, the clamp or clamps L' are provided; which clamps are preferably formed integral with the bar $L^2$.

For the purpose of securely seating the clamp to the T-shaped bar L, the eccentric $L^3$, is provided, which eccentric is pivotally attached to the bar $L^2$. It will be understood that when the clamp L', is securely clamped upon the T-shaped bar L, the bar $L^2$, together with the implement attached thereto, will be prevented from moving laterally along the T-shaped bar L.

For the purpose of preventing any swinging or oscillating movement of the bar $L^2$, the guide bars M are provided.

At the end of each section are located the uprights $b^3$, which uprights lead from the front or forward edge of the sweep proper, to the rear edge, and are attached at their top or upper ends by means of the cross-bars $b^2$, which cross-bars are located substantially as illustrated in the drawings. The object and purpose of providing the uprights, is to provide a means for continuing the guy-wires $a^3$; or in other words, providing an attaching point for the interposed guy-wires.

In the drawings the cog-wheel G', is shown located below the pinion $g^2$, but in some instances it might be better to reverse this arrangement and place the pinion $G^2$, below the cog-wheel G', it of course being understood that the bevel of the wheel G' will necessarily have to be reversed. By this arrangement the power-shaft H will be brought nearer to the surface of the ground. In the event the traveling-wheels C, are journaled far enough forward, so as to clear the back or rear portion of the sweep proper, the bent or curved connecting-link $B^2$, may be dispensed with and a straight connecting-link substituted therefor. It will be understood that the traveling-wheels C, can be located at any point between the back or rear portion of the sweep, and the front or forward portion; but I prefer to locate said wheels in the rear longitudinal center of said sweep.

In the event the device is to be used simply for cultivation, the heavy-wheels C, shown in the drawings may be dispensed with, and if desired, smaller, and lighter wheels may be substituted therefor.

For the purpose of forming a guide or leader for a horse, the rod $B^3$ is provided, and may be located substantially as shown in Fig. 2, and should be of such a length that its front or free end will be in front of the horse.

In the event a short sweep is desired, when my device is to be used for a horse-power, only, the horse may be hitched in the ordinary manner to the end of one of the main bars of the sweep, the attached sections and second main bar being dispensed with thereby bringing the horse directly in front of the traveling-wheels C. By this arrangement the device is cheapened, and is much more effective when used for horse power only; and in the cultivation of small beds for garden purposes, it may be found convenient to simply use the first section for cultivation.

In the drawings, the manner shown for communicating power from a steam-engine is that of belt-gearing; this arrangement as above described I prefer, but it will be understood that many other ways for communicating power from a steam-engine, can be employed and the same object accomplished.

For the purpose of preventing the cog-wheel G, and the pinion $g'$, from being thrown out of mesh by means of the oscillations of the sweep proper, the cogs in said wheel and pinion should be formed deep enough to allow a slight variation in the meeting faces of said wheel and pinion.

For the purpose of carrying the wheels C and K' past and over the power shaft H the bridges H' are provided which bridges may be substantially of the form shown when the wheels C and K' are adjusted to track one with the other, but if said wheels do not track then additional bridges such as shown may be provided or the single bridges formed of sufficient width to carry over both of said wheels.

Having fully described my invention, what I claim as new and desire to secure by Letters Patent, is—

1. The combination of the post A, having pivoted thereon the bar B, the bar B provided with the braces $a$ and $b$, the section B' removably attached to the main bar, and the traveling wheels C substantially as and for the purpose set forth.

2. The combination of the main or center-post A, a sweep formed in sections and pivoted on the top or upper end of the main post A, the counter-balance bearing upon the main bar B, the post A', located above the main or center post A, the guy-wires $a^3$, the traveling wheels C, and the main bar B, substantially as and for the purpose specified.

3. The combination of a sweep formed in sections, the traveling-wheels C, provided with the cog-wheels F, the pinions $f$ meshing with the cog-wheels F, the shafts $g$, the pinion $g'$, the cog-wheel G meshing with said pinion $g'$, the cog-wheel G', the pinion $G^2$, and the power-shaft H, substantially as and for the purpose specified.

4. The combination of the sections composing a sweep, and having attached thereto the T-shaped bar L, the clamp L', the bar L², and the eccentric L³, substantially as and for the purpose specified.

In testimony that I claim the above I have hereunto subscribed my name in the presence of two witnesses.

JOHN DAGES.

Witnesses:
F. W. BOND,
CHAS. M. STANDS.